United States Patent Office 3,438,726
Patented Apr. 15, 1969

3,438,726
BORIC ACID RECOVERY AND DEHYDRATION
Joseph Lee Russell, Ridgewood, and Mitchell Becker, Teaneck, N.J., assignors to Halcon International Inc., a corporation of Delaware
Continuation-in-part of application Ser. No. 310,523, Sept. 19, 1963. This application Dec. 1, 1967, Ser. No. 687,388
Int. Cl. C01b 35/00
U.S. Cl. 23—149                     3 Claims

ABSTRACT OF THE DISCLOSURE

The present invention is directed to an improved process for the recovery and workup of an ortho boric acid solution in an all liquid system for recycle and reuse in a hydrocarbon oxidation. A borate ester is hydrolyzed at elevated temperatures whereby a highly concentrated ortho boric acid solution can be recovered and this concentrated solution is dispersed in a hydrocarbon and dehydrated to produce a meta boric acid dispersion suitable for use in an oxidation process.

Related application

This application is a continuation-in-part of Ser. No. 310,523 filed Sept. 19, 1963, and now abandoned.

Background of the invention

The recovery of ortho boric acid and the dehydration of the ortho boric acid to meta boric acid has become commercially important in various fields. In certain commercial processes, for example, there exists a borate ester containing stream from which it is essential to recover ortho boric acid values and to dehydrate the recovered values to the meta boric acid form.

In various prior processes for the working up of a borate ester mixture, the borate ester mixture was reacted with water at moderate temperature to form ortho boric acid and an alcohol, with the resulting reaction mixture being separated by decantation into an alcohol containing layer and an aqueous boric acid layer dilute in boric acid. In order to recover and dehydrate the boric acid values the art usually subjected the recovered dilute aqueous boric acid solution to cooling and crystallization of ortho boric acid. These solid crystals were then recovered and dehydrated after appropriate purification by either an all solids dehydration system or alternatively by slurrying the solids in an organic liquid and then dehydrating the ortho boric acid crystals.

These prior procedures, of course, necessitated expensive and elaborate equipment such as vacuum crystallizers and also gave rise to the usual problems associated with the handling of solid crystal masses.

In accordance with the present invention, the problems associated with such prior procedures have to a considerable degree been overcome.

Summary of the invention

In accordance with the invention, an aqueous boric acid solution highly concentrated in boric acid is recovered. This is accomplished by reacting a borate ester with water at elevated temperatures of the order 102 up to 250° C. under sufficient pressure to maintain the liquid phase. Sufficient water is employed only to give a resulting concentrated aqueous boric acid solution which contains by weight about 10 to 78 percent ortho boric acid. This aqueous solution which is essentially free of solid ortho boric acid is separated from such organic products as may be associated with the borate ester mixture including the alcohol product of the borate ester reaction with water and as a further step in the present invention the ortho boric acid solution is admixed with a hydrocarbon in order to form finally dispersed concentrated aqueous boric acid solution in the hydrocarbon. This dispersion is then heated for a temperature and for a time adequate to dehydrate the aqueous ortho boric acid solution dispersion to the point where there results a dispersion of solid meta boric acid particles in the hydrocarbon.

Description of the drawings

The accompanying

Preferred embodiments

In order to indicate still more fully the nature of the present invention, the following examples of typical procedures are set forth in which parts and percents mean parts and percents by weights, respectively, unless otherwise indicated, it being understood that these examples are presented as illustrative only and they are not intended to limit the scope of the invention.

Example 1

Figure 1:
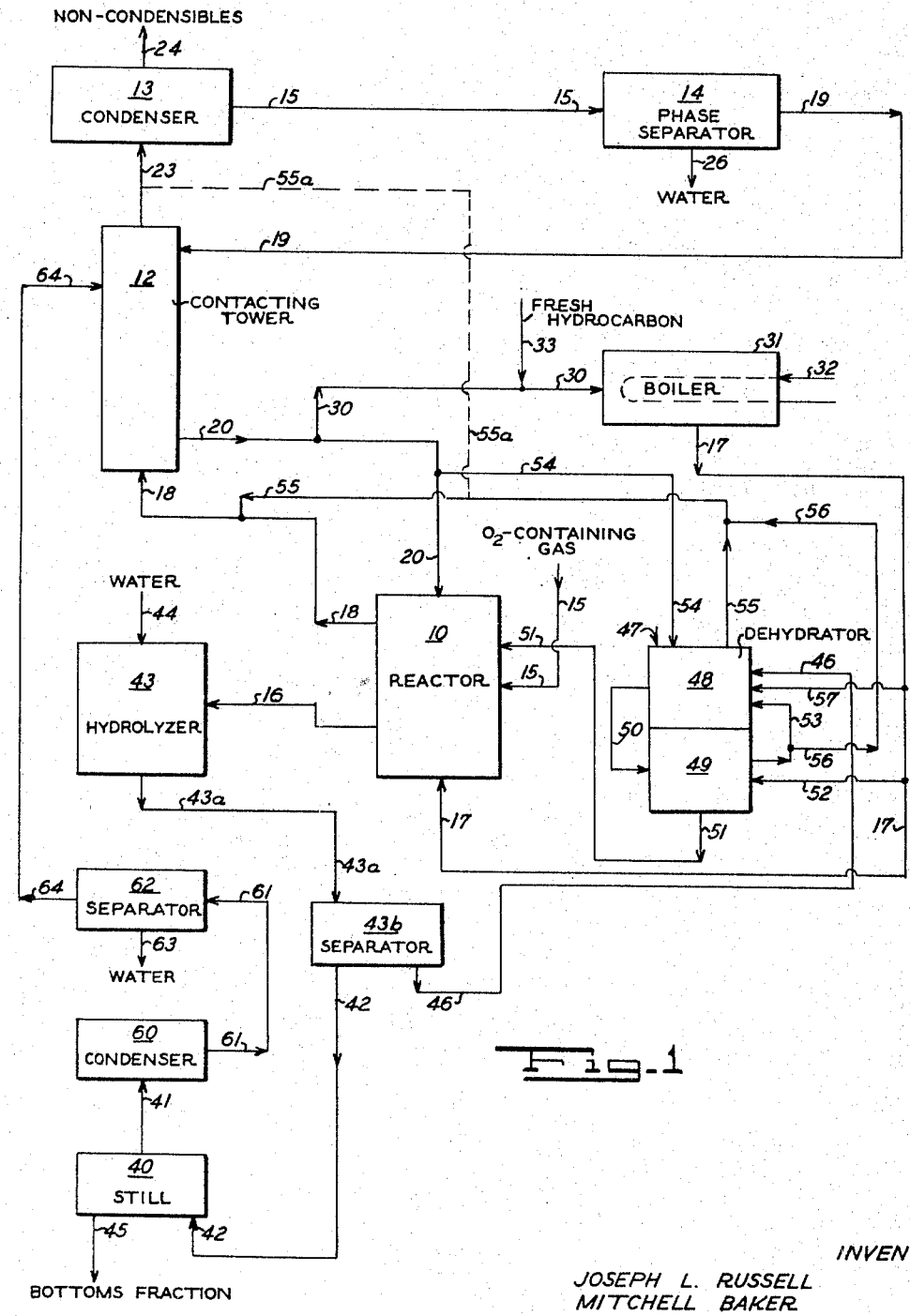
FIGURES 1 and 2 illustrate specific embodiments of the invention.

Referring to FIGURE 1 of the drawing, the batch oxidation reactor 10, which is charged with 308 parts of meta boric acid and 2711 parts of cyclohexane, is maintained at a temperature of about 330° F. and a pressure of 120 p.s.i.g. Air is introduced into the reactor 10 through line 15 and about 77 parts of $O_2$ absorbed. About 8 percent of the cyclohexane reacts and the borate ester containing liquid reaction mixture is withdrawn through line 16.

The reaction mixture is passed into hydrolyzer 43 via line 16, and water in amount of 400 parts is introduced via line 44. The mixture is hydrolyzed at a temperature of 165° C. and a pressure of 200 to 210 p.s.i.g. The amount of water present is sufficient to dissolve all of the boric material present under these conditions. The water to boric acid ratio (mol) may be varied in the range of 1:1 to 5:1, or higher. The resulting mixture is passed via line 43a to separator 43b, wherein aqueous ortho boric acid (with organics) is separated as a bottom layer.

The oil or top layer is passed via line 42 to still 40 wherein a cyclohexanol fraction is separated as bottoms fraction, and removed via line 45. The hydrocarbon vapor is passed via line 41 to condenser 60, wherein it is condensed, and passed via line 61 to separator 62. Water is separated and removed via line 63. Liquid hydrocarbon is passed via line 64 to tower 12.

The aqueous layer containing 46 parts water, 48 parts ortho boric acid, and 6 parts organics is passed via line 46 into the first section or stage 48 of dehydrator 47 wherein free water is vaporized therefrom. Heat is supplied thereto via hydrocarbon vapor introduced via line 57. Hot liquid hydrocarbon is introduced thereinto via line 54, and hydrocarbon and water vapors are removed via line 55 and passed via line 18 to tower 12 (described below). The temperature is maintained at about 155° C. The resulting hydrocarbon boron compound mixture which contains essentially no free water is passed via line 50 to the second section or stage 49 of dehydrator 47, wherein the ortho boric acid is dehydrated to meta boric acid at about 155° C. Heat is supplied thereto by hydrocarbon vapors introduced via line 52. The vaporized hydrocarbon and water mixture is removed via line 53 and it may be passed via line 56 into line 55 and then processed as described above. Preferably, however, the vapors are passed via line 53 into the first section 48 in order to supply heat thereto. Any desired system that permits the two-stage dehydration may be used.

In another alternate, the vapors may be passed via lines 55 and 55a to line 23 and then condenser 13, and processed as described below.

The resulting slurry of 10 parts meta boric acid in 90 parts hydrocarbon is passed via line 51 back to the reactor 10. The solid is finely divided, e.g., of 60 to 100 microns particle size or average diameter. It is easily pumpable, and contains no lumps.

Preferably, heat is introduced into the reactor 10 by means of hydrocarbon vapor supplied by line 17. This vapor is produced in heater 31 by means of steam introduced therein via line 32. Hydrocarbon is introduced into the heater 31 as fresh material, via line 33 or as recycled material, from lines 20 or 30. The amount of hydrocarbon vapor is sufficient to maintain the reaction mixture at the temperature desired, as well as provide the desired boil-up, and also may provide heat to tower 12.

In this way, efficient heat transfer is achieved without caking or coating on heat transfer surfaces. Where this is not desired, an indirect heater such as steam coil or jacket may be used in contact with the reaction mixture. The reaction mixture may be in the form of a slurry, some of the inorganic material being present as a solid.

In tower 12, the "wet" or "watery" hydrocarbon is heated and water is removed as vapor with some hydrocarbon, the vapor passed via line 23 is condensed in condenser 13 (noncondensables removed via line 24) and the liquid passed via line 15 to separator 14 wherein a lower water layer is separated, and removed via line 26. The upper "wet" hydrocarbon is passed via line 19 to tower 12. Dry hydrocarbon is removed from tower 12 via line 20, and passed to the reactor 10, or to line 30 and boiler 31, or both.

Good results are also achieved by dehydrating at 140° C., or at 145° C. or at 150° C.

It is most surprising that this method of operation achieves the recovery of the boric material in a condition which facilitates carrying out the reaction and at the same time eliminates solid separation equipment and operations such as crystallizing and centrifuging. Substantially all of the boric material is recovered in this way. The high temperature separation and use of high boric acid concentrations markedly reduces the dehydration load.

Example 2

The procedure of Example 1 is repeated except that the oxidation is conducted in a continuous manner, the amount of fresh hydrocarbon feed is sufficient to maintain a substantially constant level in the reactor, with continuous draw-off of some liquid reaction mixture via line 16. Similar results are obtained.

Example 3

Figure 2:
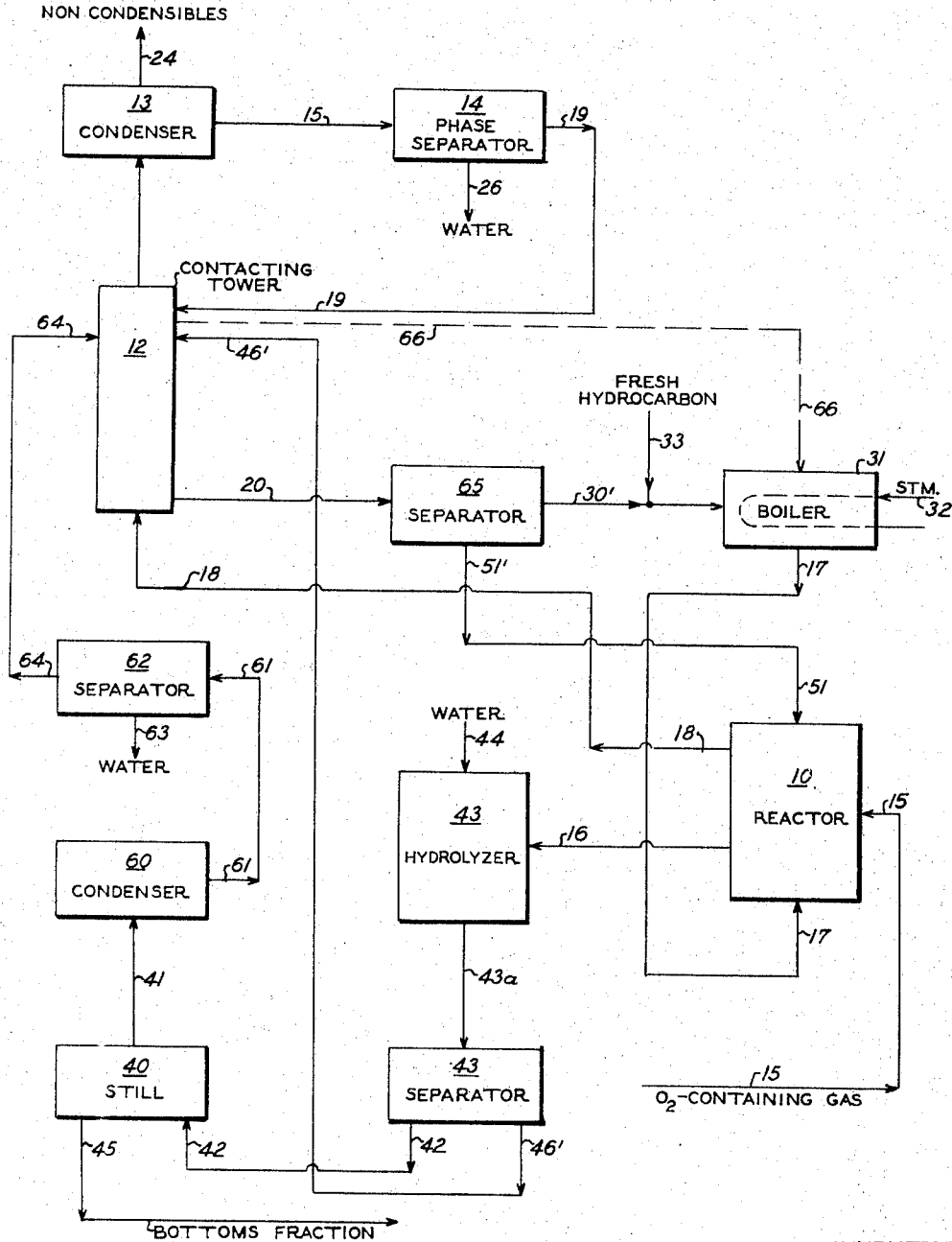

Referring to FIGURE 2 of the drawing, which is like FIGURE 1 through the separator 43b, but the aqueous layer is passed via line 47 to tower 12, which may be a baffled tower having about 6 or more baffles. The first stage of the dehydration takes place in the upper or middle part of the tower, e.g., on 2 or 3 top or middle zone baffles, and the second stage takes place in the region of the lower baffles. At the same time, the oily phase passed in via line 19 is also freed of water; preferably in the upper part of the tower. A slurry of dehydrated boric acid (i.e., meta) with hydrocarbon is passed via line 20 to separator 65 wherein the slurry is settled. Other separation or concentration means may be used, e.g., centrifugation. Hydrocarbon plus meta boric acid (thickened) slurry is passed via line 51 to the reactor 10. Hydrocarbon (upper part) is passed via line 30 to the boiler 31. If desired, the slurry may be passed directly to boiler 31, and vapor therefrom used to heat the reactor; and the remainder passed to the reactor (connection not shown).

In an alternate method, some or all of the hydrocarbon passed to boiler 31 may be taken from above the slurry feed point in tower 12 and passed via line 66; then line 20 may be joined to line 51, to pass slurry directly to the reactor 10.

The vapor from tower 12 is passed via line 23 to condenser 13 wherein it is condensed, noncondensables being removed via line 24. The liquid is passed via line 15 to separator 14, and settled. A lower water layer is separated via line 26. The upper (wet) hydrocarbon layer is passed via line 19 to the tower 12 wherein water is vaporized and removed therefrom. Additional vapor heating (not shown) may be provided, if desired. Any convenient heating means may be used in any tower or other unit of the system.

Comparable results to the foregoing are achieved with various modification thereof including the following. The hydrolysis may be carried out before or after removal of unreacted hydrocarbon from the oxidation reaction mixture. Any liquid separation means may be used (as 43b). The liquid in line 64 may be passed to line 19 or line 33 if desired (connection not shown). A lower hydrate of ortho boric acid is maintained in admixture with the reactants during the oxidation reaction, such as any of the known lower hydrates. Preferred lower hydrates are meta boric acid, tetra boric acid, boron oxide, or mixtures thereof.

In the recovery and dehydration process of this invention, the hydrolysis and separation should be done at an elevated temperature, so that the boric solution will be relatively concentrated, and minimize the amount of free water which must be sent to the dehydration step. This temperature should be in excess of 100° C., up to about 250° C., or above, preferably above 125° C., and the corresponding operating pressure of hydrolysis then will be in excess of atmospheric pressure to maintain the liquid phase. It is desirable to have the concentration of boric material during hydrolysis and separation slightly less than the saturation concentration so that no solids will come out to form a third phase and complicate the separation. Once the aqueous phase is separated, however, it does not hurt if a portion of the boric material precipitates on route to the dehydration reactor.

If the amount of free water in this process is considerably in excess the amount of free water present when solid boric acid from a centrifuge is recycled, it may be generally advantageous to use more than one stage in the dehydration reactor or step, e.g. use a multistage system or column.

Since concentrated aqueous boric solution is in contact with the reactor effluent oil, after separation of the aqueous phase, it may be desirable to further extract boric material from the organic phase, i.e., with water, in one or more additional stages, or a countercurrent water treating and separation procedure may be followed. The treatment may be such as to achieve complete practical recovery of the boric material from the organic phase. The extracts may be mixed and the boric material recovered therefrom by drying.

The recovery and dehydration process of this invention is applicable to processes for the oxidation of a wide variety of hydrocarbons. The invention is especially suitable in systems involving the oxidation of $C_4$ to $C_8$ saturated hydrocarbons such as butane, pentane, methyl butane, cyclopentane, cyclohexane, cycloheptane, cyclooctane, methylcyclopentane, methylcyclohexane, and the like.

Using a 1-gallon, glass lined, pressure hydrolyzing vessel and a pressure separation system connected therewith, borate ester containing cyclohexane oxidation effluent is agitated with water at 165° C. and 200 p.s.i.g. for one hour, allowed to settle for 15 minutes and then the lower aqueous layer is separated into a pressure receiving vessel. If there is a cloudy interface layer it may be separated into a second such vessel. The upper organic layer contains the cyclohexanone and cyclohexanol together with unreacted cyclohexane.

The ratio of boric material in the aqueous phase is about 100 relative to the concentration of boric material in the organic phase. In other words, substantially all of the boric material is recovered in the aqueous phase. In addition, as the concentration of boric material in the aqueous phase increases, the relative amount of organic value contaminants therein decreases to a bottom, and then increases again. For instance, where the aqueous phase contains about 28–30% ortho boric acid, it contains about 7.0 to 6.5%, of organic contaminants (other than cyclohexanol, cyclohexanone, and cyclohexane). Where the concentration of ortho boric acid in the aqueous phase is about 50–55%, the concentration of organic impurities drops to 3.35 to 3.50, and where the concentration of boric acid in the aqueous phase is about 60%, the concentration of organic contaminants therein is only about 4.2%.

The distribution coefficient of the ortho boric acid in the aqueous phase relative to the concentration thereof in the organic phase increases as the separation temperature is raised. At a temperature of slightly above 100° C. e.g., 102 or 103° C., the distribution coefficient is about 90 and at a temperature of about 130° C. the distribution coefficient is about 94. It rises gradually as the temperature is increased, being about 98, at about 165° C. It is preferred to operate at a temperature wherein the higher coefficient is obtained.

In carrying out the invention it is essential that the borate ester be reacted with only sufficient water such that the decanted aqueous ortho boric acid solution contains essentially no solids upon separation and contains 10 to 78% by weight ortho boric acid.

The dehydration process may be carried out in any suitable manner, preferably continuously.

The dehydration process may be carried out at elevated temperatures of 75° C. or above, desirably above 100° C. and the rate is even faster at 140° C. or above. However, a slurry of the finely divided dehydrated form of ortho boric acid is preferred for the oxidation step, since this form gives better selectivities. If the dehydration temperature is increased above about 155° C. there is a tendency for sintering or agglomeration of the solid particles. The resulting slurry is less desirable, and less effective in the oxidation step. Accordingly a most desirable upper temperature is just below that which gives such sintering.

However, it may be possible to prepare finely divided slurries at high temperatures. For instance, maintaining a high water vapor pressure during most of the dehydration may avoid formation of lower hydrates or eutectics of relatively low melting points. In this way, the dehydration may be conducted at temperatures not substantially above about 165° C. with favorable results.

Once the degree of dehydration passes the lower melting forms and substantially only higher melting forms of the acid are present, even higher temperatures may be used; e.g., near the end of the final dehydration step. These may be up to 175° C.

The separation temperature may be the same as the oxidation temperature, or it may be different.

Recycling the recovered aqueous ortho boric acid through the dehydration and oxidation reaction system gives similar or comparable conversions and selectivities in the oxidation reaction to those obtained with fresh boric material.

Generally, it is desirable to operate with a concentration of dehydrated boric material in the slurry passed to the reactor (out of the dehydration system) in the range of about 0.05% to about 35%, desirably 0.1% to 25%, and preferably about 6%.

In view of the foregoing disclosure, variations and modifications thereof will be apparent to one skilled in the art, and it is intended to include within the invention all such variations and modifications except as do not come within the scope of the appeneded claims.

What is claimed is:

1. In a method for the recovery of an aqueous ortho boric acid solution the dehydration of the ortho boric acid to meta boric acid, and the recycle of the meta boric acid to a hydrocarbon oxidation while minimizing dehydration and solids handling, the improvement of reacting water with a borate ester at a temperature of 102 to 250° C. and at a pressure sufficient to maintain the liquid phase, separating an aqueous ortho boric acid solution essentially free of solid ortho boric acid and containing 10 to 78% by weight ortho boric acid, dispersing said recovered aqueous ortho boric acid solution in a liquid hydrocarbon, heating the dispersion at a temperature in the range of 80 to 180° C. while removing water vapor from the dispersion until the ortho boric acid solution is dehydrated to a dispersion of solid meta boric acid particles in the said hydrocarbon.

2. The method of claim 1 wherein the separated aqueous ortho boric acid solution contains 50–55% by weight ortho boric acid.

3. The method of claim 1 wherein the said hydrocarbon is cyclohexane.

References Cited

UNITED STATES PATENTS

| 2,833,623 | 5/1958 | May et al. | 23—149 |
| 3,243,449 | 3/1966 | Winnick. | |
| 3,275,695 | 9/1966 | Marcell. | |
| 2,331,965 | 10/1943 | Dreyfus | 23—149 X |

OSCAR R. VERTIZ, *Primary Examiner.*

HERBERT T. CARTER, *Assistant Examiner.*